Sept. 16, 1958  M. P. BAKER  2,852,287
RESILIENTLY BONDED PIVOT JOINT UNIT
Filed Dec. 16, 1955

INVENTOR.
Max P. Baker
BY
HIS ATTORNEY

United States Patent Office 2,852,287
Patented Sept. 16, 1958

2,852,287

RESILIENTLY BONDED PIVOT JOINT UNIT

Max P. Baker, Dayton, Ohio, assignor to General Motors Corporation, Detroit, Mich., a corporation of Delaware Application December 16, 1955, Serial No. 553,561

4 Claims. (Cl. 287—85)

This invention relates to oscillatory pivot joints and more particularly to pivot joints adapted for use in spring shackles of vehicles and various other link connections.

Heretofore, pivot joints as, for example, are disclosed in the U. S. patent to Geyer 2,048,256, have generally been made wherein an inner pivot member, fixed to one of a pair of relatively oscillatable connecting members is surrounded by a sleeve or outer member, fixed to the other oscillatable connecting member, and a resilient rubber bushing is interposed between the inner and outer pivot members under compression. The rubber insert in these constructions is placed under a relatively high degree of compression whereby in operation and under heavy loads, as encountered in automobile spring shackles, a relatively small degree of radial displacement occurs between the pivot joint members, and the oscillatory motion between the pivot members is permitted by reason of the internal distortion of the rubber bushing.

It is an object of the present invention to provide an oscillatory pivot joint wherein an inner pivot member, an outer pivot member surrounding the inner pivot member and spaced therefrom, and yieldable heat resistant seals disposed in the space between the pivot members at each axial end thereof form a chamber in which is molded and cured in situ, a moldable synthetic resin base, high impact insert. In operation relative motion between the joint members is permitted by reason of one of the pivot members being rotatable relative to the other pivot member. The seals serve as a dam during the molding of the insert and are preferably held against outward axial displacement by means of a shoulder or other suitable means on one of the pivot members, and in operation of the pivot joint serve to prevent entry of dirt, water and other deleterious materials into the joint. Preferably, means is provided to lock the insert with respect to one of the pivot members, and ribs or other suitable protrusions are provided on the surface of the other joint member which project into the insert so as to permit relative rotation between the insert and the ribbed joint member and prevent relative axial movement between these members.

Further objects and advantages of the present invention will be apparent from the following description, reference being had to the accompanying drawings, wherein preferred embodiments of the invention are clearly shown.

Figure 1:
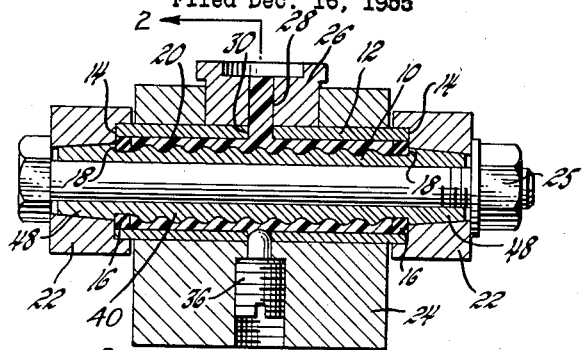
Figure 1 is an elevational view in cross section of the oscillatable pivot joint of this invention positioned in a molding fixture.

Referring to the drawings, Figure 1 shows the oscillatable pivot joint of this invention positioned in a mold fixture. The pivot joint consists of a pivot pin 10 in the form of a hollow sleeve and an outer sleeve 12 surrounding the pin 10 and being spaced therefrom and being of lesser length than the pin 10. Interposed between outer pivot member 12 and inner pivot member 10 at each end 14 of outer member 12 are yieldable, heat resistant seals 16. Preferably, the seals 16 are seated against shoulders or abutments 18 provided on the inner pivot member 10, to prevent an outer axial displacement of the seals and to provide a sealing surface with which the seals may cooperate as will hereinafter be apparent. An insert 20 of moldable high impact synthetic composition is molded in situ in the space between the joint members 10 and 12 and the spaced seal members 16.

Figure 2:
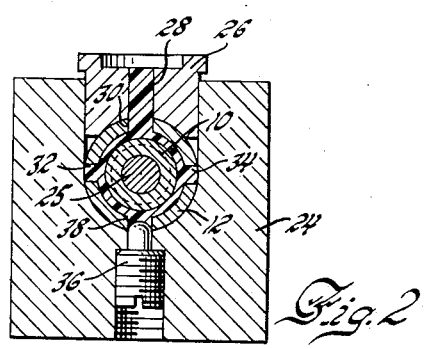
Figure 2 is a cross sectional view taken along lines 2—2.

Molding of the insert 20 between outer member 12 and inner member 10 may be accomplished by means of a suitable mold fixture as for example is shown in Figures 1 and 2. It consists of end support members 22 which are fitted about the ends of pivot members 10 and 12 and are clamped thereto by means of a nut and bolt 25. Support members 22 hold the pivot members 10 and 12 in axial alignment and cooperate with shoulders 18 of inner pivot member 10 to hold seals 16 firmly seated in position during the molding process. The assembled pivot joint members are supported in a lower mold member 24 over which is placed an upper mold member 26 having a sprue or opening 28 aligned with an opening 30 disposed in outer pivot member 12. The moldable high impact insert material may be injection molded in the space between the pivot members and the spaced seals and cured therein.

After the molding of the insert, the upper mold member 26 is forcibly removed and the insert material projecting through the aperture 30 of the outer pivot joint member serves to hold the insert against relative rotation and axial displacement with respect to outer joint member 12. Additional locks against relative movement between insert 20 and the outer pivot member may be provided by providing apertures 32 and 34 in outer pivot member 12 so that, as shown in Figure 2, the insert material will flow therein during the molding of the insert. The lower mold member 24 may be provided with an adjustable member 36 which projects into an aperture 38 disposed in the outer pivot member 12 and serves to align the member in the lower mold member. The projecting member 36 may be adjusted to partially project into the aperture 38 so that during the molding of the insert member, the insert material will partially fill the aperture 38 to form an additional mechanical lock between the insert and the outer joint member.

As shown in Figure 1, the outer surface of the inner pivot joint member 10 may be provided with circumferential projections or ribs 40 which project into the insert member 20 so as to permit relative rotation between the inner joint member 10 and the insert 20 and prevent relative axial movement of these parts.

Figure 3:
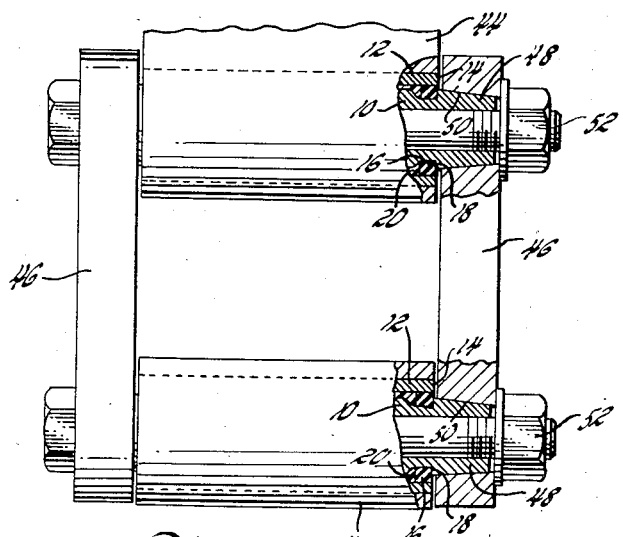
Figure 3 shows an assembled automobile spring shackle using the pivot joint of this invention, a portion of the lower joint being shown in section.

The pivot joint of the present invention may be advantageously utilized in connection with a spring shackle of automobiles as shown in Figure 3, wherein a pair of pivot joints are employed. A spring eye 42 is fixed to one of the joints preferably by a press fit of the outer joint member 12 therein. The other of the pivot joints is fixed to the bracket 44 of the chassis frame, preferably by a press fit within the eye of the bracket. The projecting ends 48 of the inner joint member extend laterally outward beyond ends of the outer pivot members 12 and spring eye 42 and bracket eye 44 sufficiently to be clamped tightly to a pair of side links 46 and leave a desired clearance between the spring and bracket members 42 and 44, outer pivot members 12 and link members 46. Preferably the projecting ends 48 of inner joint members 10 are beveled to fit snugly and be clamped tightly within correspondingly beveled sockets 50 in the side link members 46. The two bolts 52 are inserted through inner joint members 10 to rigidly hold the inner members 10 and the side links 46 together.

In operation the link members 46, bolts 52 and inner pivot members 10 serve as a rigid unit while the necessary relay oscillating movement between the inner pivot members 10 and the outer pivot members 12 is permitted due to relative sliding movement between inserts 20 and inner pivot members 10. The seals as previously described, serve to prevent the entry of dirt, water and other deleterious matter in the bearing surfaces between the insert and the relatively rotatable pivot joint member. The seal members 16 are inserted between the inner and outer pivot joint members so as to be retained therein snugly or under some degree of compression. Further, since the inserting of the insert 20 involves considerable pressure, the seals 16 are placed under compression between the insert 20 and the shoulders 18. Since the joint members move relative to each other over a relatively small arc, relative motion through the seal members is permitted, largely by reason of distortion of the seal members, whereby an effective seal is maintained between the insert and the relatively movable pivot joint member.

Although the present invention has been described in terms of a pivot joint having a relatively movable insert inner pivot member, it is obvious that the pivot joint may be readily modified to provide relative motion between the outer pivot member and the insert.

The moldable high-impact composition referred to of which a suitable insert may be molded includes the well known polyamide and superpolyamide synthetic resins which may be filled with sawdust or other masticated fibrous material and with a lubricating agent such as molybdenum disulfide. Other suitable materials include phenolic-aldehyde and urea-aldehyde resins filled with masticated fibrous material and containing a lubricating agent such as graphite. These materials suitably compounded to provide a desired degree of impact resistance are well known in the art and the present invention does not reside in the use of any of these materials specifically.

The seal members referred to may be any rubber-like yieldable heat resistant material capable of withstanding the temperatures involved in molding materials such as polyamide and phenolic-aldehyde resins. The molding of the polyamide resins may involve temperatures of over 450° F. and the molding of phenolic-aldehyde resins may involve temperatures of over 300° F. Suitable materials for the present seal members are the well known methyl silicone rubbers. As is well known in the art, these rubbers may be prepared by treating the hydrolysis product of pure dimethyl dichlorosilane with reagents which are capable of increasing the molecular weight without resorting to cross linking. The resulting elastomer is then milled with suitable inorganic filters as is done with natural or synthetic rubber. A curing catalyst is added during the mixing and the plaster mass is molded to the desired shape of the seal member and is cured to an in soluble infusible elastic material.

While the form of embodiment of the invention as herein disclosed constitutes a preferred form, it is to be understood that other forms might be adopted as may come within the scope of the claims which follow.

What is claimed is as follows:

1. An oscillatable pivot joint comprising an inner pivot member, an outer pivot member surrounding said inner member and forming a chamber therebetween, a pair of heat resistant yieldable seals disposed within said chamber in spaced relation in sealing engagement with said members, and a high impact moldable synthetic composition insert interposed and bonded between said pivot members and said seals, said insert being in engagement with said seals.

2. An oscillatable pivot joint comprising an inner pivot member, an outer pivot member surrounding said inner member and forming a chamber therebetween, heat resistant yieldable seals disposed within said members in spaced relation in sealing engagement with said members, one of said members having a shoulder extending radially toward the other member axially outwardly of said seals, retaining said seals against axial outward displacement and providing a sealing surface therefor, and a moldable high impact synthetic composition insert interposed and bonded in said chamber between said pivot members and said seals, said insert being in engagement with said seals.

3. An oscillatable pivot joint unit adapted to connect two relatively oscillatable members, comprising an inner pivot member adapted to be fixed to one of said members, an outer pivot member adapted to be fixed to the other of said members and surrounding said inner member and forming a chamber therebetween, heat resistant yieldable seal members extending between said members in spaced relation and in sealing engagement therewith, said inner member having radially extending shoulders disposed axially outwardly of said seals and retaining said seals against outward displacement and providing a sealing surface therefor, said external surface of said inner pivot member having at least one circumferential raised portion disposed between said seals, and a moldable high impact synthetic resin composition insert interposed and bonded in said chamber between said seals, said insert being in engagement with said seals, said circumferential raised portion being operative to prevent axial displacement between said insert and said inner joint member.

4. An oscillatable pivot joint comprising an inner pivot member, an outer pivot member surrounding said inner member and forming a chamber therebetween, a first of said pivot members having a cylindrical surface having a recess therein facing the other member, heat resistant yieldable seals disposed within said chamber in spaced relation and in sealing engagement with said members, said other member having shoulders extending radially toward said first pivot member axially outwardly of said seals, retaining the seals against axial outward displacement and providing a sealing surface therefor, and a moldable high impact synthetic composition interposed and bonded in said chamber between said pivot members and said seals, said insert being in engagement with said seals, said composition being seated in said recess, whereby said first pivot member is non-rotatable relative to said composition.

References Cited in the file of this patent

UNITED STATES PATENTS

| | | |
|---|---|---|
| 1,939,444 | Geyer | Dec. 12, 1933 |
| 2,246,086 | Austin | June 17, 1941 |
| 2,324,997 | Brown | July 29, 1943 |
| 2,522,350 | Ditter | Sept. 12, 1950 |
| 2,600,321 | Pyle | June 10, 1952 |